INVENTORS
PHILIP BURROWS
RICHARD J. KAVANAUGH

BY *Donald P. Gillett*

ATTORNEY

July 15, 1969  R. J. KAVANAUGH ET AL  3,456,178
PHOTOELECTRIC CHRONOMETRIC GOVERNOR
Filed Sept. 8, 1966  2 Sheets-Sheet 2
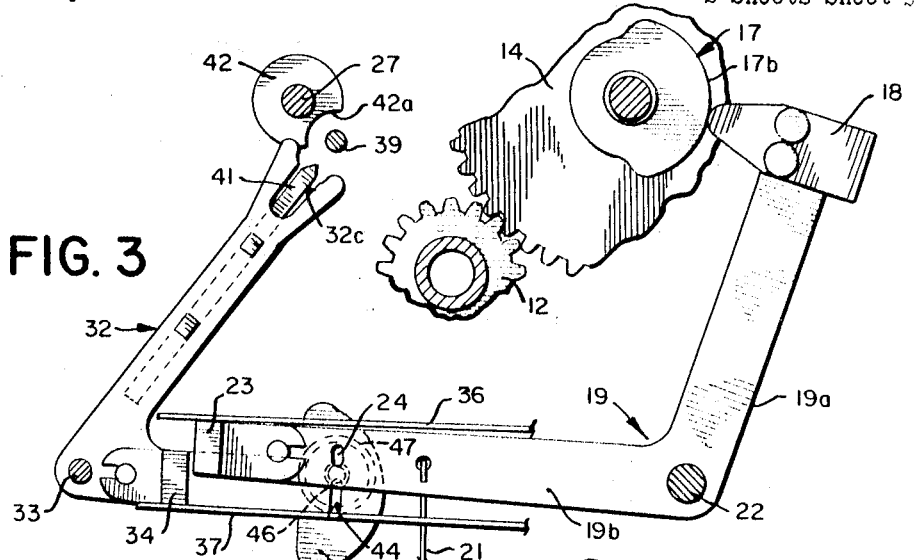
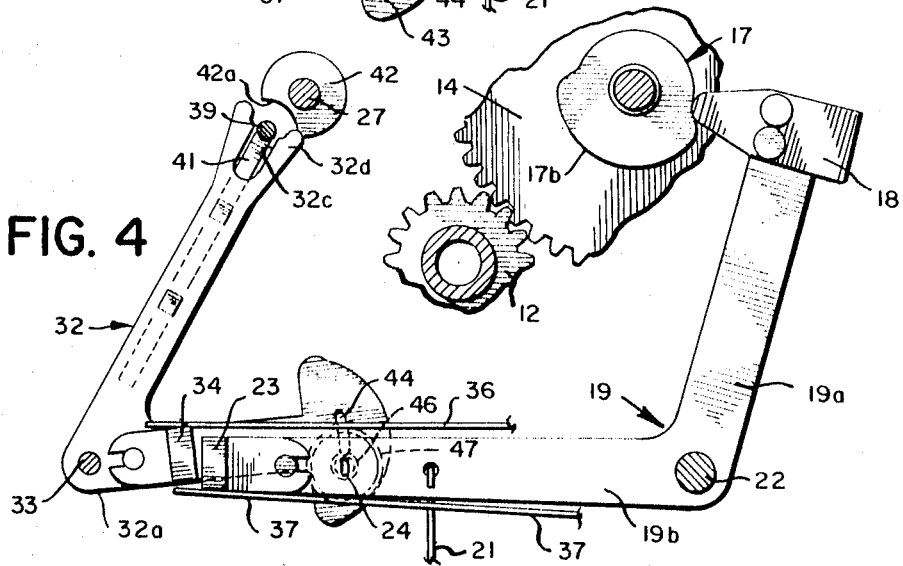
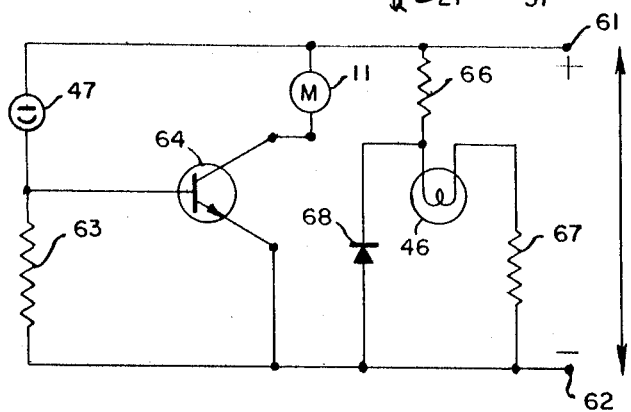
INVENTORS
PHILIP BURROWS
RICHARD J. KAVANAUGH
BY
ATTORNEY United States Patent Office 3,456,178
Patented July 15, 1969

3,456,178
PHOTOELECTRIC CHRONOMETRIC GOVERNOR
Richard J. Kavanaugh, Bristol, and Philip R. Burrows, Middlebury, Conn., assignors to Consolidated Electronics Industries Corp., New York, N.Y., a corporation of Delaware
Filed Sept. 8, 1966, Ser. No. 577,967
Int. Cl. H02p 7/18; G05b 5/01
U.S. Cl. 318—313                                5 Claims

ABSTRACT OF THE DISCLOSURE

A chronometric motor governor including a light source directing light along a path and two members, either of which can prevent light from reaching the detector unless both members are aligned in a certain way. One member is controlled by the motor to move between certain positions and the other is controlled by an oscillating system to allow alignment only synchronously with the frequency of the oscillating system. The two members are resiliently connected so that the motor-controlled member can supply enough power via the other member to keep the oscillating system running. The duration of alignment time in each cycle determines the length of light pulses reaching the detector, and a control circuit uses the resulting pulse signals from the detector to control the motor to apply enough power to keep it running synchronously.

---

This invention relates to a chronometric governor for an electric motor and particularly to a governor without mechanical make and break contacts in the governing circuit but utilizing instead a beam of light and a photosensitive circuit to control the driving current of the motor.

The basic elements of a chronometric governor include: an oscillating mechanical system, the periodicity of which is largely independent of the speed of the motor that is to be controlled; means for obtaining information as to the speed of the armature of the motor, or to be more precise, means for determining the position of the rotor as a function of time; and means for comparing information about the speed or position of the rotor with information as to the periodicity of the oscillating system and for producing a resultant electrical control condition that determines the average driving current applied to the motor, usually by dividing the driving current into pulses and governing the duty cycle of the pulses.

Such a governor is described and claimed in Haydon Patent 2,523,298. In that patent the means for comparing the periodicity of the oscillating system with the position of the rotor includes a pair of levers, one of which is actuated by a cam on the armature to move between two limit positions and other of which engages the oscillating system to be driven back and forth by it between two limit positions. The second lever has a dual purpose in that it also is capable of furnishing sufficient power to the oscillating system to set the latter into motion and to keep it oscillating. The power supplied to the oscillating system need only be enough to overcome losses due to friction and to other factors, all of which are relatively minor as compared to the total power output of which the motor is capable. In addition to the two levers, the means for comparing operation of the oscillating system with operation of the armature also includes a pair of spring-mounted electrical contacts biased toward each other but capable of being forcibly separated by either or both of the levers as they swing back and forth between their limit positions. These contacts are connected in series with the driving winding of the motor and therefore carry the driving current. As a result the contact faces tend to erode with time and may, under certain circumstances, become welded together or, under other circumstances, may cease to make electrical contact at all. Because of the several types of malfunctioning of which the contacts are capable, they form one of the primary limiting factors of the life of the governor. Since these governors are used because of their high accuracy in controlling the speed of the motor, any failure of operation may be catastrophic, and if the governors are used, as they sometimes are, in research in outer space where there is no possibility of repair, equipment of great scientific or military importance and costing tremendous sums of money may become totally useless through the failure of the minute contacts of one governor.

It is a primary object of the present invention to avoid the use of mechanical contacts while at the same time obtaining all of the advantages of chronometric governor action. Further objects will become apparent from the following specification.

In accordance with the present invention there is provided, in a chronometric governor having a mechanical oscillating system and means to determine the rotational position of the armature, a source of light and a photosensitive device arranged to receive the light. However, in the path of the light are two light controlling devices, one connected to the oscillating system to move in synchronism therewith and the other connected so as to be moved in synchronism with the rotation of the armature. Both of these light control devices act to vary the average intensity of the light reaching the photosensitive device and in such a way that the oscillating frequency of the mechanical system is compared with the rotational speed of the armature. The photosensitive device is connected to an electrical circuit which in turn is connected to the driving winding of the motor to control the current therethrough and thus to control the speed of the motor so that this speed will be very precisely governed by the oscillation of the oscillating system.

The invention will be described in greater detail in connection with the drawings in which:

FIG. 3 shows the cam lever and balance wheel lever of the governor of FIG. 1 in one limit position;

FIG. 4 shows the cam lever and balance wheel lever of FIG. 3 in another position; and FIG. 5 is a schematic wiring diagram of the governor circuit.

Figure 1:
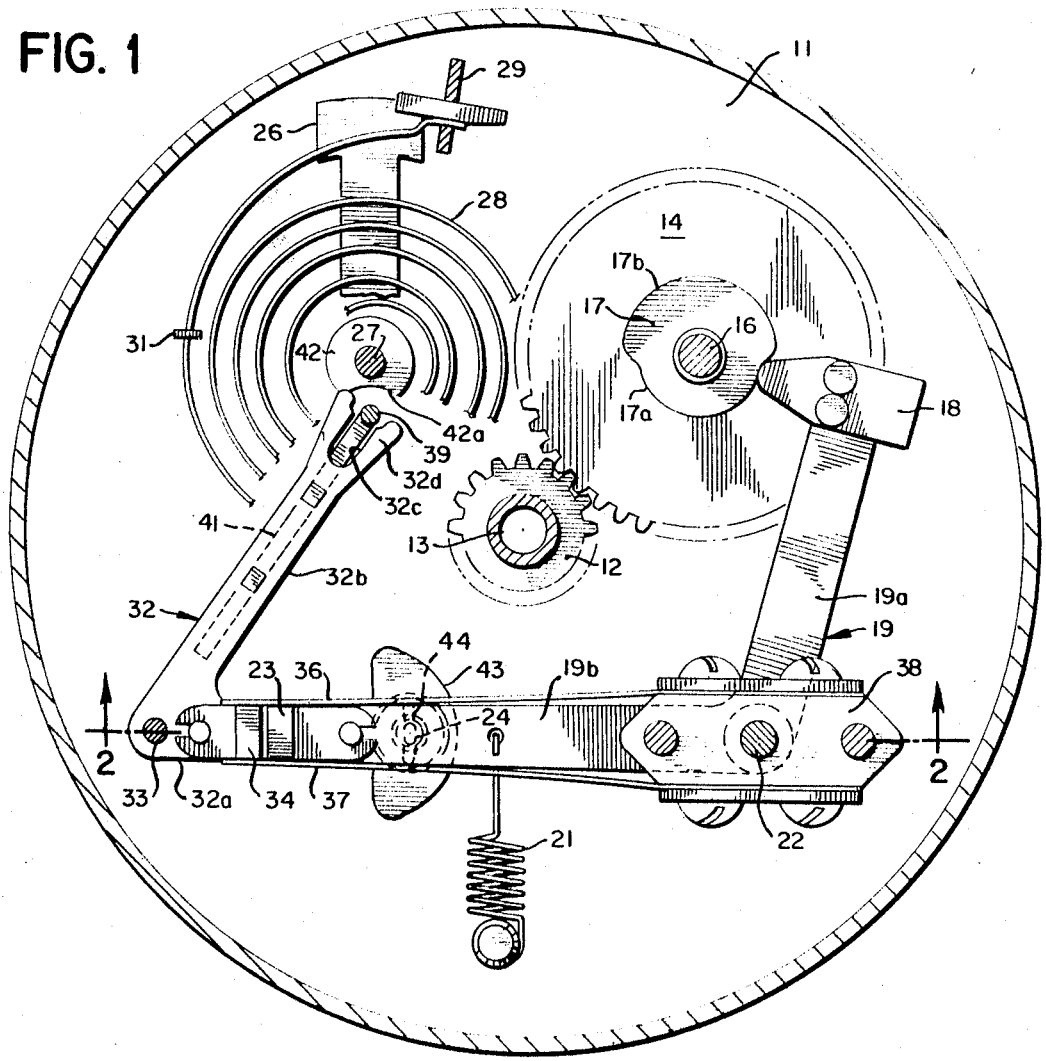
FIG. 1 is a plan view of a governor constructed according to the invention.

The governor in FIG. 1 is mounuted at one end of the housing of a motor 11 and is driven by means of a pin 12 on the motor shaft 13. The pin meshes with a gear 14 that is rigidly connected to a cam 17, and both the gear and the cam are rotatably mounted on a shaft 16. The cam has two circular sections 17a and 17b, each of which covers about half of the circumference of the cam.

A follower 18 is attached to one arm 19a of an angle lever 19 that is biased by a spring 21 attached to the other arm 19b to press the follower against the surface of the cam 17. The lever is pivotally mounted on a pin, or axle, 22 and has a post 23 attached to the outer end of the arm 19b and an aperture 24 in the same arm between the post and the pin.

The governor also includes an oscillating system comprising, primarily a balance arm 26, which is rigidly attached to an axle 27, and a spiral hair spring 28, one end of which is attached to the axle and the other end of which is attached to a fixed support 29. The axle is pivotally mounted in a bearing to permit the balance arm 26 to rotate back and forth as freely as possible, causing the spring 28 to be alternately wound slightly tighter and then unwound. A regulator 31 engages the spring at some point along its length to govern the spring tension and hence the natural oscillating frequency of the oscillating system.

The necessary power to cause the oscillating system to oscillate is supplied by the motor 11 acting through the lever 19 and a balance lever 32 connected thereto to be driven thereby. The balance lever is pivotally mounted on a pinion 33 and has a post 34 at the end of a short arm 32a adjacent to the post 23. A pair of springs 36 and 37 is mounted on a fixed block 38 and extends generally parallel to the arms 19b and 32a. Both of the springs 36 and 37 are biased inwardly so that they press against opposite sides of both of the posts 23 and 34 so that as the arm 19b moves back and forth, the springs cause the arm 32a and hence the lever 32, to move back and forth also.

The lever 32 has another arm 32b with a notch 32c at its outer end. This notch engages an impulse pin 39 attached to the balance arm 26 so that it extends generally parallel to the axle 27. The arm 32b has a pin 41 attached to it to cooperate with a balance wheel roller 42 to prevent improper movement of the balance wheel with respect to the notched lever 32. The pin 41 is behind the notched lever 32 in the view shown in FIG. 1 and is in line with the roller 42 to fit into a cut-away portion 42a in the roller. As the notched lever 32 moves back and forth, it engages the pin 39 to drive the balance arm 26 and its roller 42 first in one direction and then in the opposite direction. The pin 41 is able to mesh with the cut-away portion 42a if it moves synchronously with the roller 42, but if the mechanism is struck or vibrated, the pin 41 engages the edges of the cut-away portion 42a and prevents too great a pivotal movement of the balance wheel. The lever arm 32a has an extension 43 attached thereto and provided with an aperture 44 in line with the aperture 24.

Figure 2:
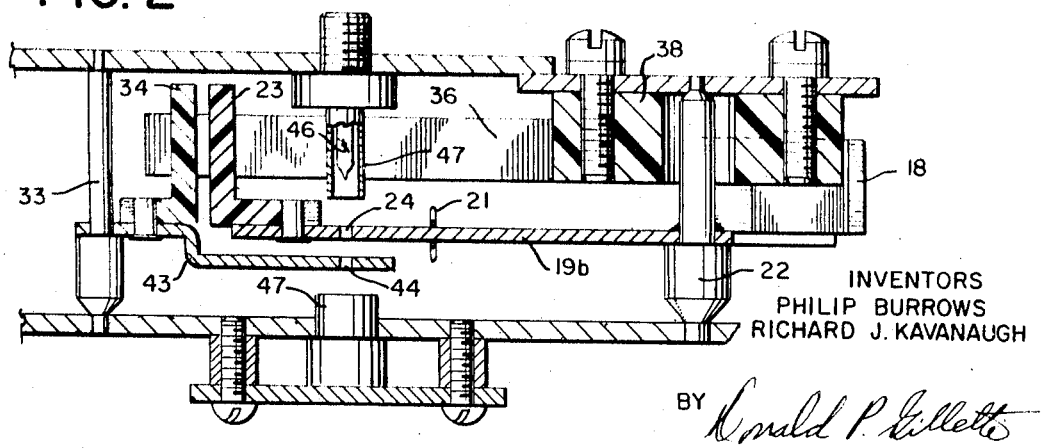
FIG. 2 is a side view of the governor in FIG. 1.

FIG. 2 is a side view of the apparatus in FIG. 1 with some of the parts shown in cross-section. The latter parts include the extension 43 and the lever arm 19b to illustrate the alignment of the apertures 44 and 24 therein. Directly above the aperture 24 is a very small light bulb 46 in a housing 47 and below the extension 43 is a photo sensitive light detector 47, which is capable of generating an electrical signal in response to the light from the bulb 46.

The operation of the mechanical governor will be illustrated with particular reference to FIGS. 3 and 4. FIG. 3 shows the gear 14 and the attached cam 17 rotated to a position in which the larger radius surface 17b is in line with the follower 18. This pivots the lever 19 as far clockwise as it will go and causes the post 23 to push the spring 36 away from the post 34. At the same time the post 23 is removed from contact with the spring 37 so that the latter presses against only the post 34, which causes the post 34 to pivot the lever 32 counterclockwise.

It is assumed that the oscillating system is already in oscillation, and as a result, the balance arm 26 and its pin 39 will have been pivoted counterclockwise as far as they will go. As the natural force of the spring drives the pin 39 back in a clockwise direction, the movement of the lever 32 causes the notch 32c to engage the pin 39 and to move substantially simultaneously with it. However, under normal circumstances, the frictional forces acting on the oscillating system will have caused the pin 39 to have lagged slightly behind the position it should occupy if it were free-running and thus the prong 32d of the lever 32 will press against the pin 39 and supply just enough power to make up the losses of the oscillating system and keep the system in oscillation at the proper frequency.

The relative positions of the levers 19 and 32 in FIG. 3 are indicative of the condition that exists when the motor is attempting to go faster than it should. This creates an out-of-phase condition which causes the apertures 24 and 44 to be out of alignment with each other so that no light can pass through them from the bulb 46 to the detector 47.

At a later stage in the relative movement of the levers 19 and 32, the pinion 12 will have rotated the gear 14 and the cam 17 to bring the cam surface 17a into position opposite the follower 18. This permits the lever 19 to pivot as far counterclockwise as it will go. This, in turn, causes the post 23 to press against the spring 37 and to remove the latter from contact with the post 34. At the same time the other side of the post 23 is removed from contact with the spring 36, which bears against the post 34 and thus forces the lever 32 to rotate clockwise.

In the relative position of the parts shown in FIG. 4, the balance wheel is not in its full clockwise position, and the pinion 39 is within the notch 32c. If it is assumed that the balance wheel, the post 27 and the impulse pin 39 are rotating counterclockwise exactly in step with the movement of the lever 32, no power will be supplied to the oscillating system, which means that the speed of the motor, as indicated by the rotating speed of the pinion 12 is exactly synchronous with the frequency of the oscillating system.

FIG. 5 is a schematic diagram of the electrical circuit upon which the governor is based. All electrical current for supplying the power to operate both the motor 11 and the control circuit is introduced into the circuit through two terminals 61 and 62. The operating current is, of course, direct current and may be supplied by a battery. The first circuit connected in series between the two terminals 61 and 62 includes the detector 47 and a load resistor 63. The output, or base-emitter, circuit of a transistor 64 is connected in series with the motor 11 to form a second series circuit connected between the terminals 61 and 62 and the base of the transistor is connected to the junction between the detector 47 and its load resistor 63. These elements constitute the control portion of the circuit, since the operating current to the driving coil of the motor 11 must flow through the output circuit of the transistor 63, and the conductivity of the transistor, in turn, is determined by the conductivity of the photosensitive detector 47.

For convenience, the power supply that energizes the control circuit also supplies current for the light bulb 46. The light 46 is connected in series with two current-limiting registors 66 and 67 between the terminals 61 and 62. A stabilizing diode 68 is connected in parallel with the light bulb and one of the resistors 67 to help maintain the illumination at a constant value.

While the light bulb 46 and the detector 47 are electrically connected in the same circuit, they are, as has been described hereinabove, separate from each other so that the light from the bulb 46 can reach the detector 47 only under certain limited conditions. When the light does reach the detector 47, the latter becomes more highly conductive, which increases the current from the detector and its load resistor 43 and biases the base of the transistor 64 to a conductive state. The circuit may be operated as an on-off device with the transistor 64 either biased to a completely non-conductive condition or to full conduction if the change of conductivity of the detector 47 is sufficient. This will be true if the light reaching the detector 47 from the bulb 46 is sufficient to saturate the detector, but even if that is not true, the change in the biased lever of the transistor may still raise the transistor to its saturation level. If the transistor 64 does operate as an on-off device, the motor will be energized with full driving current when the transistor conducts and will be completely deprived of the energizing current when the transistor is non-conductive. Basically, the motor should receive driving current when its running speed is less than the desired synchronous speed and should be deprived of the driving current as soon as it exceeds the synchronous speed. What actually happens is that, for constant running conditions, the motor will be energized at short, spaced, intervals of time. If the motor tends to run more slowly, due to increased load or any other factor, the durations of these intervals would increase. Conversely, if the load decreased, the duration of the intervals would also decrease.

The intervals during which light from the bulb 46 reaches the detector 47 are determined by the positions of the apertures 24 and 44 which, in turn, are controlled by the positions of the levers 19 and 32. The position of the lever 19 is entirely determined by the motor, since the cam 17 is geared directly to the motor and the tension of the spring 21 is such as to keep the follower 18 always in contact with the cam. While the position of the lever 32 is primarily determined by the oscillations of the oscillating system made up primarily of the balance arm 26 and the spring 28, it is also at least partially determined by the pressure of the springs 36 and 37 which are in turn affected by the position of the lever 19, as indicated particularly in FIGS. 3 and 4. The pressure of the springs 36 and 37 may be somewhat less than would be required if they were to carry the operating current of the motor, as in the case of the mechanical governor of U.S. Patent 2,523,298, and as a result, there is less coupling between the lever 19 and the lever 32 in the present invention than there would be in the case of a completely electrical mechanical governor.

One of the important advantages of the present governor is the elimination of contact arcing or sparking with its concomitant electrical electrical noise and contact wear. All of these factors make for a smoother-running instrument with reduced mechanical load on the oscillating system, which is thus able to operate more precisely at its predetermined speed.

What is claimed is:

1. A governor for a motor having an armature, said governor comprising:
   a light source;
   a light detector responsive to the light from said source for developing a control signal representative of the light reaching said detector;
   means for interrupting the light directed from said light source to said light detector over a prescribed duration representative of the desired speed of said motor;
   means for sensing the position of said armature;
   means for altering, at intervals, the interruption of said light directed from said light source to said light detector in accordance with the position of said armature;
   resilient means connecting said means for altering the interruption of said light to said means for interrupting the light from said light source to supply mechanical power to the latter;
   and control circuit responsive to said control signal for controlling the power supplied to said motor.

2. A governor for a motor having an armature, said governor comprising:
   a light source;
   a light detector responsive to the light from said light source for developing a control signal representative of the light reaching said light detector;
   first and second levers pivotally mounted and provided with first and second apertures, respectively, having prescribed paths of motion for pivotal movements of said levers, said first and second levers being so positioned relative to each other that said paths of motion of said apertures overlap for a predetermined distance;
   an oscillating system comprising a balance wheel and spiral spring in driving connection with said first lever for storing energy imparted from said first lever and for releasing the stored energy to said first lever to cause said first lever to undergo pivotal oscillations;
   means responsive to the output shaft of said motor for driving said second lever to cause said second lever to undergo pivotal oscillations;
   spring means connecting said second lever to said first lever to drive said first lever to supply power to said oscillating system;
   and a circuit connected to said detector to be controlled by said control signal to govern the supply of power to said motor.

3. A governor for a motor having an armature, said governor comprising:
   a light source;
   a light detector responsive to the light from said source for developing a control signal representative of the light from said source that reaches said detector;
   an oscillating system having a natural frequency commensurate with a desired rotational speed of said armature and comprising a first opaque member movably mounted between said source and said detector;
   a second opaque member between said source and said detector and coupled to said armature to move synchronously therewith, said opaque members having configurations that cooperate to permit pulses of light to pass from said source to said detector, the duration of each of said pulses corresponding to the instantaneous shift of position of said armature with respect to the position that it would occupy at that instant if rotating uniformly at said desired speed;
   resilient means connecting said first and second opaque members whereby said second member can supply energy by way of said resilient means to said first member and said oscillating system to maintain said oscillating system in an oscillatory condition, and;
   a rigid support for said oscillating system, said opaque members, and said resilient means.

4. A governor for a motor having an armature, said governor comprising:
   a light source;
   a light detector responsive to the light from said source for developing a control signal representative of the light reaching said detector;
   means comprising a mechanical oscillating system and a first lever connected thereto to oscillate at a predetermined speed, said means also comprising a member having an aperture between said source and said detector whereby light can pass through said aperture from said source to said detector for pre-determined intervals of time corresponding to the speed of oscillation of said system;
   means for sensing the position of said armature and for altering, at intervals, the interruption of said light from said source to said detector in accordance with the position of said armature;
   said last named means comprising a second lever connecting said armature to move in accordance therewith;
   resilient means connecting said second lever to said first lever to energize said oscillating system from said first lever;
   and a control circuit connected to said detector to respond to said control signal for controlling the power supplied to said motor.

5. A governor for a motor having an armature with an output shaft, said governor comprising:
   a light source;
   a light detector respsonsive to light from said source for developing a control signal representative of the light reaching said detector;
   a cam of prescribed contour coupled to said output shaft;
   an escape lever having a cam follower at one end thereof to engage said cam and a first aperature at the other end thereof;
   a first spring acting on said escape lever urging said cam follower to bear against said cam;
   a first pedestal mounted on said escape lever;
   an oscillating system comprising a balance wheel and spiral spring, said system having a natural frequency dependent upon the mass of said wheel and the spring constant of said spiral spring;

a pallet lever having one end thereof in driving connection with said balance wheel and adapted to impart energy to said balance wheel and spiral spring and a second aperture at the other end thereof, said pallet lever being so positioned with respect to said escape lever that the paths of motion of said first and second aperatures overlap for a prescribed distance of their motions;

a second pedestal mounted on said pallet lever;

a first leaf spring on one side of said first and second pedestals and prevented from bearing against said second pedestal by said first pedestal until said cam rotates said escape lever for rotating said pallet lever to impart energy to said balance wheel and spiral spring;

a second leaf spring on the other side of said first and second pedestals and displaced by said first pedestal when said first leaf spring is permitted to rotate said pallet lever for returning said pallet lever to its initial position after said cam returns said first pedestal to its initial condition;

and a control circuit connected to said detector to be governed by said control signal for controlling the power to said motor.

References Cited

UNITED STATES PATENTS 2,968,756  1/1961  Devol _____ 318—480 X
3,239,741  3/1966  Rank _____ 318—480 X ORIS L. RADER, Primary Examiner ROBERT J. HICKEY, Assistant Examiner